Figure 1:
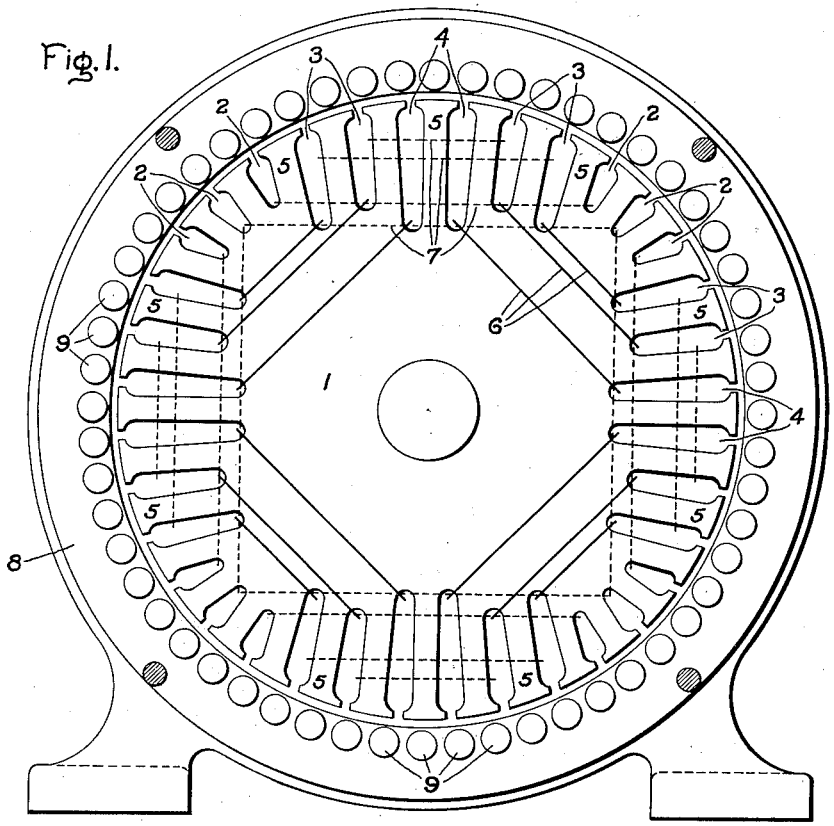

Dec. 22, 1925.

A. F. WELCH 1,566,939

DYNAMO ELECTRIC MACHINE

Filed Nov. 13, 1923

Inventor:
Alfred F. Welch,
by Alexander F. Lunn,
His Attorney.

Patented Dec. 22, 1925.

1,566,939

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

DYNAMO-ELECTRIC MACHINE.

Application filed November 13, 1923. Serial No. 674,577.

*To all whom it may concern:*

Be it known that I, ALFRED F. WELCH, a citizen of the United States, residing at Fort Wayne, in the county of Allen, State of Indiana, have invented certain new and useful Improvements in Dynamo-Electric Machines, of which the following is a specification.

My invention relates to dynamo electric machines and has for its object a novel construction of one of the members of such a machine whereby the magnetic material of the member is used to better advantage than was heretofore possible and the available space for the winding of the member is materially increased.

Although my invention is applicable to dynamo electric machines generally, it is particularly applicable to single phase alternating current motors of the inducton type provided with starting windings. A motor of this type has a nearly uniform revolving field, so that for best operation its field should present a uniform magnetic permeance for each unit element of the air gap periphery (represented usually by a tooth, when the teeth are equiangularly spaced). However, the main running winding is concentric with a larger number of turns in the outside than in the inside coils of each pole, and the starting winding requires only a very small area, part of which is arranged in slots left unfilled by the main winding. The slot area required is therefore not uniformly distributed around the periphery. Such a motor consequently requires a uniform distribution of peripheral iron cross section and a non-uniformly distributed winding.

It has been customary heretofore to make the punchings with equally spaced slots of the same size. With this arrangement, some of the slots, particularly those containing the starting winding only, are nearly empty so that a lot of slot space is not utilized. If these slots are simply made smaller, the slot space is all utilized but the flux path through the adjacent teeth becomes much larger, so that the magnetic permeance is large through these teeth and is small through the teeth adjacent the main winding slots. Such an arrangement thus wastes flux carrying area. With either of these arrangements, therefore, the member carrying these windings is larger than is necessary for either the flux carrying or current carrying capacity.

In order to overcome these objections and increase the capacity of such a machine, or any dynamo electric machine having a non-uniformly distributed winding, or, to have the same capacity with less material, I shape the slots so that their area is such as to be filled with the winding and at the same time preserve a substantially uniform magnetic permeance.

The application of my invention to any dynamo-electric machines having a non-uniformly distributed winding will be clear to those skilled in the art from the explanation thereof as applied to a single phase induction motor.

Other features of the novelty which characterize my invention are pointed out with particularity in the claims annexed to and forming a part of this specification. For a better understanding of my invention, reference may be had to the following description taken in connection with the accompanying drawing, in which Fig 1 is a view of a dynamo electric machine embodying my invention, Fig. 2, is a view of a lamination of the rotatable member of the machine of Fig. 1, and Fig. 3 is a diagram of connections.

In the drawing, I have illustrated my invention in a single phase alternating current motor of the induction type in which the primary winding is mounted on the rotatable member of the machine, the secondary member being stationary and of the squirrel cage type. The rotatable member comprises laminations 1 having slots 2, 3 and 4 in the periphery thereof. The area of certain of the slots is different from the area of other of the slots, as shown in the drawing, the area of slots 2 being much less than the area of the slots 3 and 4. A winding is non-uniformly distributed in the slots and substantially fills the same. The teeth 5 between all the slots are all substantially equal and uniform in width, that is, the body of the teeth are all substantially equal and uniform in width as are the tips of the teeth, as shown in the drawing and preferably all the slots are substantially equiangularly spaced about the periphery of the member. The winding on the rotatable member comprises a running portion 6 and a starting portion 7. The running portion is indicated by solid lines, and the starting portion is indicated by dotted lines. In the particular arrangement of the winding shown, slots 2 contain only coils of the starting portion of the winding, the slots 3 contain coils of both the starting and running portions of the winding, and the slots 4 contain coils of only the running portion of the winding.

The stationary member 8 is built up of laminations having conductors 9 located in slots in the periphery thereof the conductors 9 being short circuited so as to form a squirrel cage winding.

Figure 2:
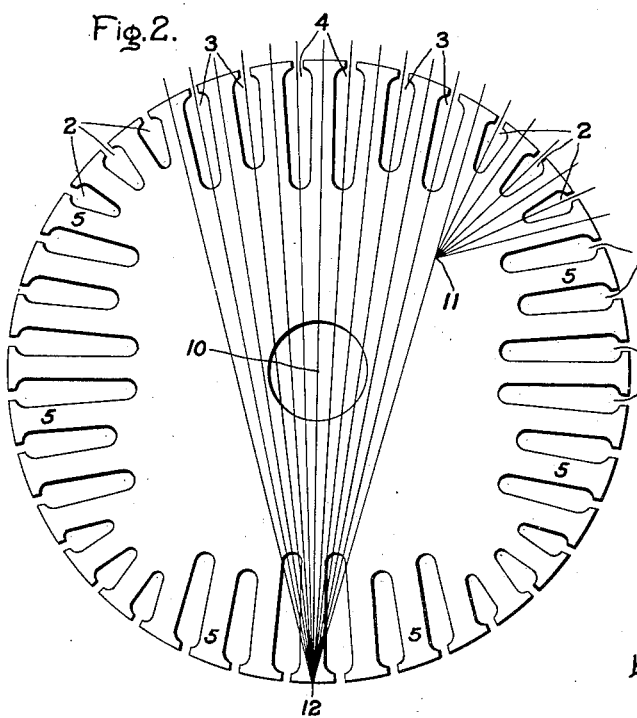
Figure 3:
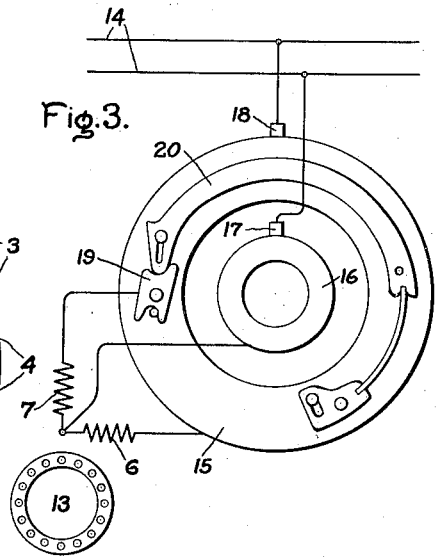

In Fig. 2 is illustrated one of the laminations which, when assembled with other similar laminations, make up the rotatable magnetic member of the machine of Fig. 1. The center of this lamination is indicated at 10. From Fig. 2 it will be seen that certain of the slots are inclined at different angles to radii of the magnetic member. The slots 2 are radial to a point 11 which is different from the center of the lamination and slots 3 and 4 are radial to a point 12 which is different from the center of the lamination 10 and different from the center of the first mentioned slots. The radius of the slots 2 which contain only coils of the starting portion of the winding, is less than the radius of the lamination, that is, less than the radius of the magnetic member, and the radius of the slots 3, which contain coils of both the starting and running portions of the winding and the slots 4, which contain coils of the running portion only of the winding, is greater than the radius of the magnetic member.

As pointed out above, a single phase induction motor with a main and a split phase starting winding has a non-uniformly distributed winding. In accordance with my invention, in order to preserve the uniform distribution of permeance with an equiangular slot spacing, the slots being substantially completely filled with the winding, I proceed as follows:—

(1) The area required for each slot is first determined from the number of turns and size of wire required in each slot to give the desired electrical characteristics. In a 4 pole 36 slot member, the usual areas required would be, for the slots in each pole, about in the ratio of 40:37:34:9:10:9: 34:37:40.

(2) Center lines for the larger slots, 3, 4, for each pole are then drawn converging to a center, the radius of which is considerably greater than the radius of the member, as shown in the Fig. 2, and center lines for the smaller slots 2 are similarly drawn converging to a center, the radius of which is considerably less than the radius of the member.

(3) The slots are then laid out with suitable tapers so as to give approximately constant width to each tooth. The points to which the slot center lines converge and the amount of taper of the slot sides are adjusted by trial until as nearly as possible a constant area of the radial flux path is attained independent of radial depth and the same area is obtained for each tooth, maintaining at the same time the greatest ratio of width of each tooth to length of each tooth consistent with the proper slot area and a uniform angular spacing of the teeth at the periphery of the member.

In other words, the width of each tooth compared with the length of tooth is made as great as possible subject to the following conditions:—

(1) that the peripheral slot spacings shall be equal;

(2) that the effective tooth width compared to the tooth length shall be nearly the same for every tooth;

(3) that the slot areas shall be equal to certain specified values which are not uniform, and (4) that the depth of each slot shall be made as great as practicable consistent with obtaining a utilizable width of slot and a satisfactory depth of core below the slots.

The circuit arrangement is as shown in Fig 3. The stationary secondary member of the motor comprising a squirrel cage winding is represented in this figure by 13. The rotatable member carries the primary winding consisting of the main portion 6 and the starting portion 7. The primary winding is connected to single phase mains 14 through collector rings 15 and 16 on which brushes 17 and 18 bear. The main portion 6 of the primary winding is directly connected across the collector rings 15 and 16. The starting portion 7 of the winding is connected at one end directly to collector ring 16, and the other end is connected through a centrifugal switch to collector ring 15. This switch comprises a contact 19 insulated from the collector ring 15 and a movable contact 20, electrically connected to collector ring 15. The end of the starting portion of the winding is connected to the contact 19. When the motor is at rest, the connections are as shown in Fig. 3, both the starting and main portions of the primary winding being connected to the mains 14, since the contact 20 is spring pressed into engagement with the contact 19 completing the circuit of the starting portion of the winding through the collector ring 15, brush 18, to one of the mains 14. The motor remains connected in this way until the rotatable member, carrying the primary winding and the centrifugal switch, reaches a predetermined speed. At this speed the contact 20 moves out of engagement with contact 19 by centrifugal force, opening the circuit of the starting winding 7. The motor then continues to run at its normal speed with only the main portion of the winding connected to the mains 14.

With my arrangement, I am able to utilize to much better advantage than was possible heretofore, the magnetic material of the magnetic member forming the primary member of the motor. In the particular arrangement shown I am able to increase the tooth section approximately 13% and at the same time materially increase the available winding space. This arrangement also will reduce the excitation losses, and thus improve the motor efficiency and also improve the power factor of the motor. That is to say, with a given amount of material a motor can be built in accordance with my invention with a considerably greater output and with better characteristics than was heretofore possible, or a motor can be built for a given output with considerably less material.

My invention when applied to the rotatable member of a machine has the further advantage of slightly reducing the mean length of turn of the primary winding. It will be noted from Fig. 1, that the inside coils for each pole of the main portion of the winding located in slots 3 are considerably shorter than if they were wound in radial slots. The slots 4 containing the outer coils for each pole of the main portion of the winding are, however, substantially radial. This has the further advantage that the end turns are distributed, the end turns of the inside coils in slots 3 being kept toward the periphery of the rotatable member and allowing the outside coils in slots 4 to come close in toward the center of the rotatable member, thus reducing the height of the winding on the end of the rotatable member. Furthermore, it is a decided advantage to have the slots 3 in one pole inclined toward the slots 3 in the adjacent pole, when the winding on the rotatable member is wound by machine, because the winding is made much easier, the turns naturally finding their way first to the bottom of the slot and then gradually filling the slot.

Although I have described my invention as applied to a single phase induction motor with a rotatable primary member, it is evident that it is also applicable to such a motor with a stationary primary member or in fact to any dynamo electric machine having a non-uniformly distributed winding, and I aim in the appended claims to cover all such modifications and any others which do not depart from the spirit and scope of my invention.

What I claim as new and desire to secure by Letters Patent of the United States, is,—

1. In a dynamo electric machine, a magnetic member having slots therein, the area of certain of said slots being different from the area of other of said slots, and a winding non-uniformly distributed in said slots and substantially filling said slots, the width of the teeth between said slots being substantially equal and uniform.

2. In a dynamo electric machine, a magnetic member having slots therein, the area of certain said slots being different from other said slots, said slots being substantially equi-angularly spaced about the periphery of said member, and a winding non-uniformly distributed in said slots and substantially filling said slots, the width of the teeth between said slots being substantially equal and uniform.

3. In a dynamo electric machine, a magnetic member having slots therein, the area of certain of said slots being different from the area of other of said slots, certain of said slots being inclined at different angles to radii of said magnetic member, said slots being substantially equi-angularly spaced about the periphery of said member, and a winding non-uniformly distributed in said slots, and substantially filling said slots, the width of the teeth between said slots being substantially equal and uniform.

4. In a dynamo electric machine, a magnetic member having slots therein, the area of certain of said slots being different from the area of other of said slots, the center line of certain of said slots being radial to a point different from the center of said magnetic member, and the center line of other of said slots being radial to a point different from the center of said magnetic member and from the center of said first mentioned slots, said slots being substantially equi-angularly spaced about the periphery of said member, and a winding non-uniformly distributed in said slots, and substantially filling said slots, the width of the teeth between said slots being substantially equal and uniform.

5. In a dynamo electric machine, a magnetic member having slots therein, the area of certain of said slots being different from the area of other of said slots, the center line of certain of said slots being radial to a point different from the center of said magnetic member, and the center line of other of said slots being radial to a point different from the center of said magnetic member and from the center of said first mentioned slots, the radius of said first mentioned slots being greater than the radius of said magnetic member, and the radius of said last mentioned slots being less than the radius of said magnetic member, said slots being substantially equi-angularly spaced about the periphery of said member, and a winding non-uniformly distributed in said slots, and substantially filling said slots, the width of the teeth between said slots being substantially equal and uniform.

6. In a single phase alternating current motor, a magnetic member having slots therein, the area of certain of said slots being different from the area of other of said slots, said slots being substantially equi-angularly spaced about the periphery of said member, and a winding for said motor comprising a starting portion and a running portion, certain of said slots containing only coils of said starting portion, others of said slots containing coils of said running portion and said starting portion, said winding substantially filling said slots, said slots containing only said starting portion being inclined at a different angle to the radii of said magnetic member than said other slots, the width of the teeth between said slots being substantially equal and uniform.

7. In a single phase alternating current motor, a magnetic member having slots therein, the area of certain said slots being different from the area of other of said slots, said slots being substantially equi-angularly spaced about the periphery of said member, and a winding for said motor comprising a starting portion and a running portion, certain of said slots containing only coils of said starting portion, others of said slots containing coils of said running portion and said starting portion, said winding substantially filling said slots, the center line of said slots containing only said starting portion being radial to a point different from the center of said magnetic member, and the center line of said slots containing coils of said running portion and said starting portion being radial to a point different from the center of said magnetic member and from the center of said slots containing only said starting portion, the width of the teeth between said slots being substantially equal and uniform.

8. In a single phase alternating current motor, a magnetic member having slots therein, the area of certain said slots being different from the area of other of said slots, said slots being substantially equi-angularly spaced about the periphery of said member, and a winding for said motor comprising a starting portion and a running portion, certain of said slots containing only coils of said starting portion, others of said slots containing coils of said running portion and said starting portion, said winding substantially filling said slots, the center line of said slots containing only said starting portion being radial to a point different from the center of said magnetic member, and the center line of said slots containing coils of said running portion and said starting portion being radial to a point different from the center of said magnetic member and the center of said slots containing only said starting portion, the radius of said slots containing coils of said running portion and said starting portion being greater than the radius of said magnetic member, and the radius of said slots containing only said starting portion being less than the radius of said magnetic member, the width of the teeth between said slots being substantially equal and uniform.

9. In a single phase alternating motor, a magnetic member having slots therein, the area of certain of said slots being different from the area of other of said slots, said slots being substantially equi-angularly spaced about the periphery of said member, and a winding for said motor comprising a starting portion and a running portion, certain of said slots containing only coils of said starting portion, others of said slots containing coils of said running portion and said starting portion, and still other of said slots containing only coils of said running portion, said windings substantially filling said slots, the center line of said slots containing only said starting portion being radial to a point different from the center of said magnetic member, and the center line of all of said other slots being radial to a point different from the center of said magnetic member and from the center of said slots containing only the starting portion, the radius of said slots containing coils of said running portion and said starting portion and containing coils of said running portion only being greater than the radius of said magnetic member, and the radius of said slots containing only said starting portion being less than the radius of said magnetic member, the width of the teeth between said slots being substantially equal and uniform.

10. In a dynamo electric machine, a rotatable member comprising laminations having slots therein, the area of certain of said slots being different from the area of other of said slots, the center line of certain of said slots being radial to a point different from the center of said member, the center line of other of said slots being radial to a point different from the center of said member and from the center of said first mentioned slots, the radius of said first mentioned slots being greater than the radius of said member and the radius of said last mentioned slots being less than the radius of said member, said slots being substantially equi-angularly spaced about the periphery of said member, and a winding non-uniformly distributed in said slots and substantially filling the same, the width of the teeth between said slots being substantially equal and uniform.

11. In a single phase alternating current motor a rotatable member comprising laminations having slots therein, the area of certain of said slots being different from the area of other of said slots, said slots being substantially equi-angularly spaced about the periphery of said member, and a winding for said motor comprising a starting portion and a running portion non-uniformly distributed in said slots and substantially filling the same, the center line of certain of said slots being radial to a point different from the center of said member, the center line of other of said slots being radial to a point different from the center of said member and from the center of said first mentioned slots, the radius of said first mentioned slots being greater than the radius of said member, and the radius of said last mentioned slots being less than the radius of said member, the width of the teeth between said slots being substantially equal and uniform.

12. In a single phase alternating current motor, a rotatable member comprising laminations having slots therein, the area of certain of said slots being different from the area of other of said slots, said slots being substantially equi-angularly spaced about the periphery of said member, and a winding for said member comprising a starting portion and a running portion, certain of said slots containing only coils of said starting portion, others of said slots containing coils of said running portion and said starting portion of the winding, said winding substantially filling said slots, the center line of said slots containing only said starting portion being radial to a point different from the center of said member, the center line of said slots containing coils of said running portion and said starting portion being radial to a point different from the center of said member and the center of said slots containing only said starting portion, the radius of said slots containing coils of said running portion and said starting portion being greater than the radius of said member, and the radius of said slots containing only said starting portion being less than the radius of said member, the width of the teeth between said slots being substantially equal and uniform.

In witness whereof, I have hereunto set my hand this 10th day of Nov., 1923.

ALFRED F. WELCH.